United States Patent
Ito

Patent Number: 6,167,204
Date of Patent: *Dec. 26, 2000

[54] NUMBER-OF-PRINTS INDICATING APPARATUS FOR CAMERA

[75] Inventor: Kenji Ito, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/654,892

[22] Filed: May 29, 1996

[30] Foreign Application Priority Data

Jun. 1, 1995 [JP] Japan .................................. 7-135233

[51] Int. Cl.$^7$ ............................. G03B 17/24; G03B 19/06
[52] U.S. Cl. ............................................ 396/311; 396/446
[58] Field of Search .................................. 354/21, 289.1; 396/446, 281, 284, 207, 208, 210, 311, 310

[56] References Cited

U.S. PATENT DOCUMENTS

| | | | |
|---|---|---|---|
| 4,760,413 | 7/1988 | Taniguchi et al. | 354/106 |
| 5,032,855 | 7/1991 | Taniguchi et al. | 354/21 |
| 5,142,310 | 8/1992 | Taniguchi et al. | 354/106 |
| 5,497,213 | 3/1996 | Yoshida et al. | 354/21 |
| 5,523,861 | 6/1996 | Tanaka et al. | 358/475 |
| 5,555,047 | 9/1996 | Tsuji et al. | 354/106 |
| 5,557,358 | 9/1996 | Mukai et al. | 354/219 |
| 5,652,643 | 7/1997 | Saito et al. | 396/311 |
| 5,751,343 | 5/1998 | Hibino et al. | 348/96 |
| 5,751,505 | 5/1998 | Yoshida | 360/48 |
| 5,778,265 | 7/1998 | Seki | 396/311 |
| 5,815,753 | 9/1998 | Amano | 396/319 |

*Primary Examiner*—David M. Gray
*Assistant Examiner*—Christopher E. Mahoney
*Attorney, Agent, or Firm*—Robin, Blecker & Daley

[57] ABSTRACT

A camera or a number-of-prints indicating apparatus for a camera includes a determination circuit for determining whether a film loaded in the camera is a negative film or a positive film and an indication circuit for indicating a number of prints in accordance with a determination result by the determination circuit.

54 Claims, 7 Drawing Sheets

NUMBER-OF-PRINTS INDICATING APPARATUS FOR CAMERA

BACKGROUND OF THE INVENTION

1. FIELD OF THE INVENTION

The present invention relates to a number-of-prints indicating apparatus for a camera which is arranged to indicate the number of prints to a photofinishing laboratory.

2. Description of the Related Art

In recent years, it has been proposed to provide a camera which is arranged to indicate the number of prints to a photofinishing laboratory by recording the number of prints on a film.

In the case of a negative film, it is general practice for camera users to request photofinishing laboratories to make one print from each frame of the film along with development thereof. In the case of a positive film, camera users commonly request photofinishing laboratories to developed the film without printing it.

For this reason, a user of the aforesaid type of camera needs to change the setting of the number of prints to be recorded on a film to be loaded into the camera, according to whether the film is a negative film or a positive film. This manipulation is very complicated for the user.

SUMMARY OF THE INVENTION

One aspect of the present invention is to provide a camera and a number-of-prints indicating apparatus for a camera, each of which includes determination means for determining whether the film loaded in the camera is a negative film or a positive film, and indication means for indicating the number of prints according to a determination result by the determination means, so that the indication of the number of prints to a photofinishing laboratory or the like can be facilitated.

Other aspects of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
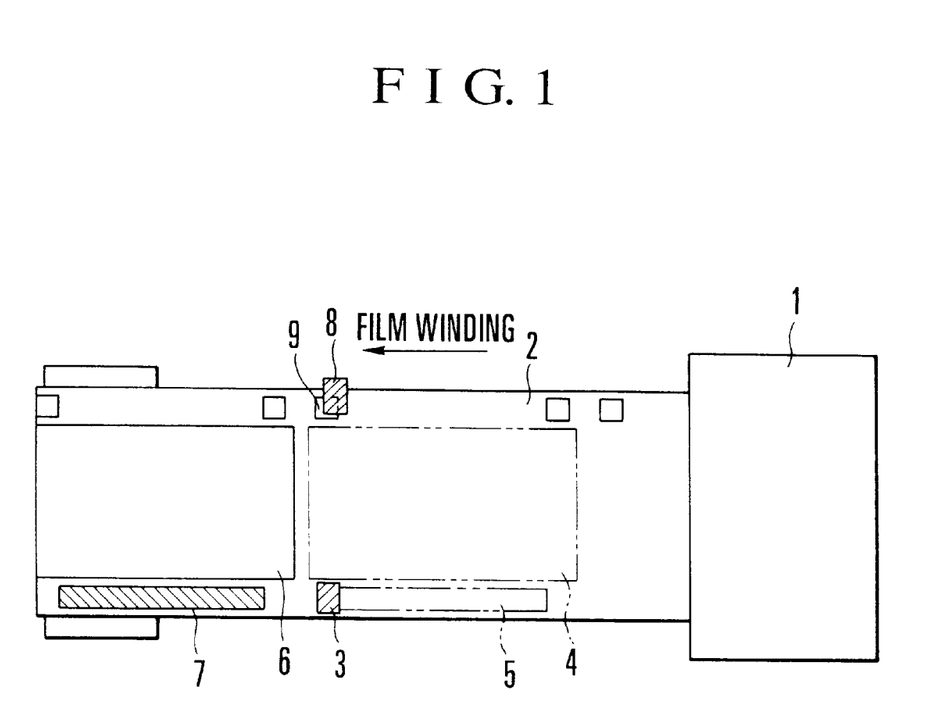
FIG. 1 is a view showing the relationship between a film and a magnetic head according to each embodiment of the present invention.

FIG. 1 schematically shows the relationship between a film and the magnetic head of a camera according to each of the embodiments of the present invention. In FIG. 1, reference numeral 1 denotes a film cartridge, reference numeral 2 denotes a film having a magnetic surface for magnetic recording, and reference numeral 3 denotes a magnetic head for recording or reading magnetic information on or from the film 2. This magnetic head 3 is disposed in such a manner as to be positioned at the leading end of a magnetic recording part 5 relative to a frame 4 to be exposed during the next photography. Reference numeral 6 denotes a photographed frame, and reference numeral 7 denotes a magnetic recording part on which a magnetic recording corresponding to the photographed frame 6 has been made.

Reference numeral 8 denotes a photointerruptor for detecting perforations 9 of the film 2. Through the photointerruptor 8, the boundaries between adjacent frames are detected.

Figure 2:
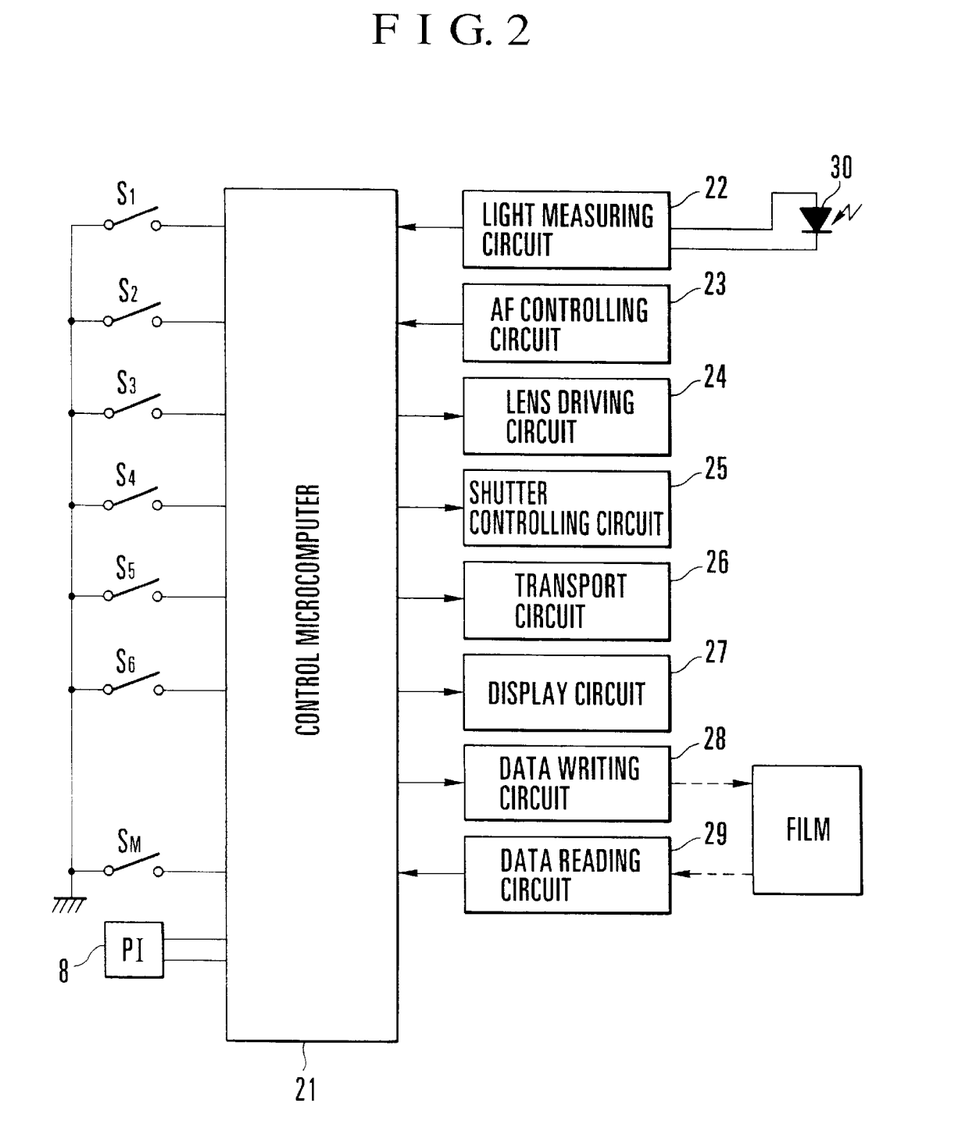
FIG. 2 is a circuit block diagram showing the circuit arrangement of a camera according to each embodiment of the present invention.

FIG. 2 is a circuit block diagram showing the circuit arrangement of the camera according to each of the embodiments of the present invention. In the arrangement shown in FIG. 2, a control microcomputer 21 performs computations and sequence control for the camera, and various circuits 22 to 29, such as the light measuring circuit 22, are connected to the control microcomputer 21. The input ports of the control microcomputer 21 are provided with switches and other elements through which to input manipulations for photography or to set various states. These constituent elements will be described below in detail. The light measuring circuit 22 receives measured-light data from a light measuring sensor 30 and sends the measured-light data to the control microcomputer 21. The AF controlling circuit 23 sends to the control microcomputer 21 photoelectric conversion information relative to a subject image present in an AF area. The control microcomputer 21 performs a computation on the data sent from the AF controlling circuit 23, and the lens driving circuit 24 moves a photographing lens (not shown) on the basis of the defocusing or measured-distance data obtained from the computation result. The shutter controlling circuit 25 drives a shutter (not shown) according to the measured-light data. The transport circuit 26 performs winding or rewinding of the film 2 in accordance with an instruction sent from the control microcomputer 21. The display circuit 27 displays the information sent from the control microcomputer 21. The data writing circuit 28 writes the information sent from the control microcomputer 21 into the magnetic recording part 5 on the film 2 through the magnetic head 3. The data reading circuit 29 reads various kinds of information recorded on the film cartridge 1 and sends them to the control microcomputer 21.

The switches will be described below.

If a switch $S_1$ is turned on, a preparatory operation for photography, such as AF operation or light measurement computation, is started. If a switch $S_2$ is turned on, a photographing operation is started. The camera according to the present embodiment has a release button of the two-stroke press-button type. When the release button is pressed to the first stroke position, the switch $S_1$ is turned on, and when it is pressed to the second stroke position, the switch $S_2$ is turned on. A switch $S_3$ is a position-of-chargecam detecting switch for detecting whether a charge cam, which operates as an actuator for bringing the magnetic head 3 into contact with the film 2, is located at its initial position, and if the charge cam is located at the initial position, the switch $S_3$ is turned on. A switch $S_4$ is a battery detecting switch which is turned on if a battery is loaded in a battery chamber (not shown). A switch $S_5$ is a number-of-prints setting switch, and a switch $S_6$ is a cartridge switch which is turned on if the film cartridge 1 is loaded in a cartridge chamber. A switch $S_M$ is a main (power) switch.

The operation of the circuit arrangement shown in FIG. 2 will be described below with reference to the flowchart of the control microcomputer 21.

Figure 3:
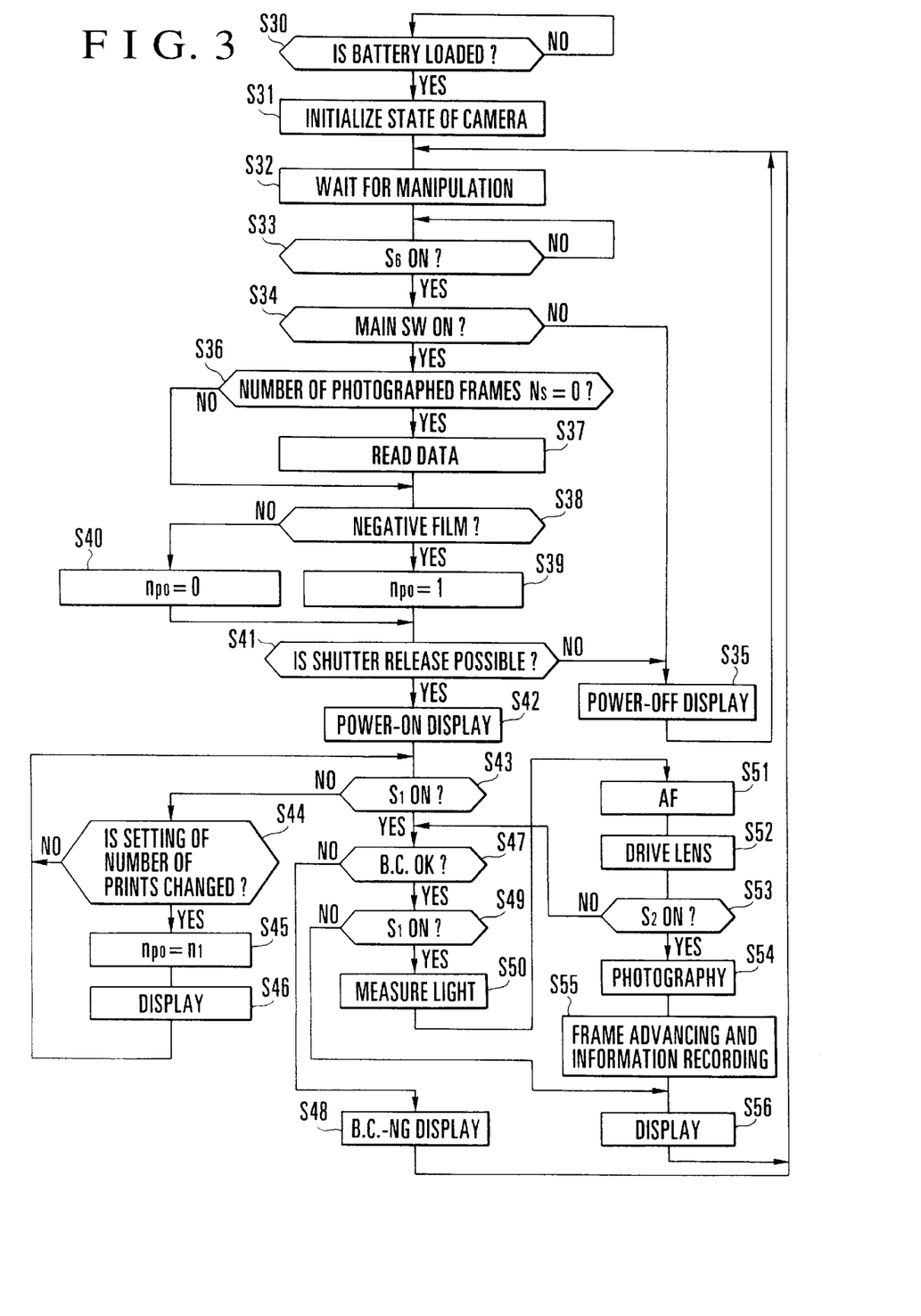
FIG. 3 is a flowchart of the operation of a control microcomputer of FIG. 2, showing a first embodiment of the present invention.

FIG. 3 shows the main routine of the operation of the control microcomputer 21. First, if a battery is loaded into the camera, the battery detecting switch $S_4$ is turned on (step S30). If the loading of the battery is detected, the control microcomputer 21 initializes the state of the camera (Step S31). Then, the control microcomputer 21 waits for the next operation (Step S32). If the film cartridge 1 is loaded and the switch $S_6$ is turned on (Step S33), it is determined whether the switch $S_M$ is on (Step S34). If the switch $S_M$ is off, the control microcomputer 21 causes the display circuit 27 to display the off state of the main power of the camera (Step S35), and the process returns to Step S32.

On the other hand, if the switch $S_M$ is on, it is determined whether the number of photographed frames, $N_s$, is "0" (step S36). If no photography has yet been performed and the number of photographed frames, $N_s$, is "0", the reading of the data recorded on the film cartridge 1 is performed in Step S37.

If photography has previously been performed, the data reading of Step S37 is not performed, and the process proceeds to Step S38. Then, the kind of film is determined through the data reading circuit 29, and in the case of a negative film, an initial value $p_o$ of the number of prints is set to $n_{PO}=1$ (step S39). If the kind of film is not a negative film but a positive film, the initial value np of the number of prints is set to $n_{PO}=0$ (Step S40).

Then, it is determined whether a shutter release is possible (step S41). Whether the shutter release is possible is determined according to whether a release inhibition flag is set in a memory in the control microcomputer 21. If the shutter release is inhibited, the display circuit 27 is made to provide a main-power-off display (Step S35), and the process returns to Step S32. On the other hand, if the shutter release is possible, the display circuit 27 is made to provide a main-power-on display (Step S42), and it is determined whether the switch $S_1$ is on (Step S43). If the switch $S_1$ is not on, it is determined whether the setting of the number of prints has been changed through the number-of-prints setting switch $5_o$. (Step S44). If the setting of the number of prints has been changed, the changed number of prints, $n_1$, is substituted for the initial value $nP_o$ of the number of prints (Step S45). The display circuit 27 is made to display the changed number of prints (Step S46), and the process returns to Step S43. On the other hand, if the setting of the number of prints is not changed, the process returns to Step S43.

If it is detected in Step S43 that the switch Si is on, a battery check is made in Step S47 to determine whether the battery has enough energy for the next operation.

If the battery has enough energy, it is determined whether the switch $S_1$ is on (Step S49). If the battery check shows that the energy of the battery is not enough, the display circuit 27 is made to provide a battery-check-NG display (Step S48). In this case, the battery needs to be replaced with a new battery. If the battery check shows that the energy of the battery is enough, it is determined that the switch $S_1$ is on (Step S49). If the switch $S_1$ is on, the light measuring circuit 22 is made to measure light (Step S50). Then, the AF controlling circuit 23 is made to detect defocusing or measure distance (Step S51), and the lens driving circuit 24 is made to adjust the focus of the photographing lens (Step S52). Then, it is determined whether the switch $S_2$ is on (Step S53), and if the switch $S_2$ is off, the process returns to Step S47. If the switch $S_2$ is on, the shutter controlling circuit 25 performs a photographing operation (Step S54). Then, the process proceeds to a one-frame advancing and information recording routine (Step S55). Then, in Step S56, the display circuit 27 is made to provide a display, and the process returns to Step S32.

Figure 4:
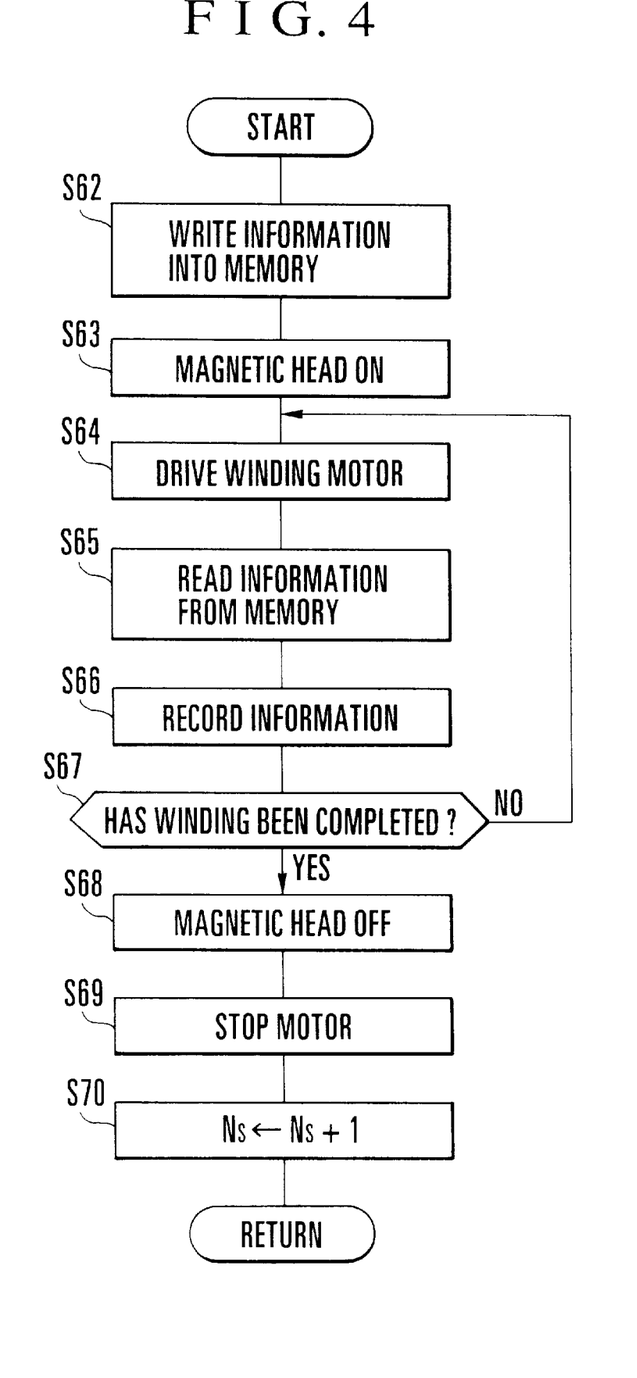
FIG. 4 is a flowchart of the operation of the control microcomputer of FIG. 2, showing the first embodiment of the present invention.

The frame advancing and information recording routine of Step S55 will be described below with reference to the flowchart of FIG. 4.

First of all, photography data and data representative of the value $n_{PO}$ of the number of prints are written into the memory in the control microcomputer 21 (Step S62). Then, the data writing circuit 28 is turned on (Step S63), and the film 2 is advanced by one frame by the transport circuit 26, during which time the photography data and the data representative of the value $n_{PO}$ of the number of prints, both of which have been written into the memory, are recorded on the magnetic recording part 5 of the film 2 (Steps S64 to S66).

Then, it is determined through the photointerruptor 8 whether the aforesaid one-frame advance has been completed (Step S67). If the one-frame advance has not yet been completed, the process returns to Step S64, and if the one-frame advance is completed, the data writing circuit 28 is turned off (Step S68) and the transport circuit 26 is stopped (Step S69), and the number of photographed frames, $N_S$, is incremented by one (Step S70). The process returns to the main routine of FIG. 3.

Figure 5:
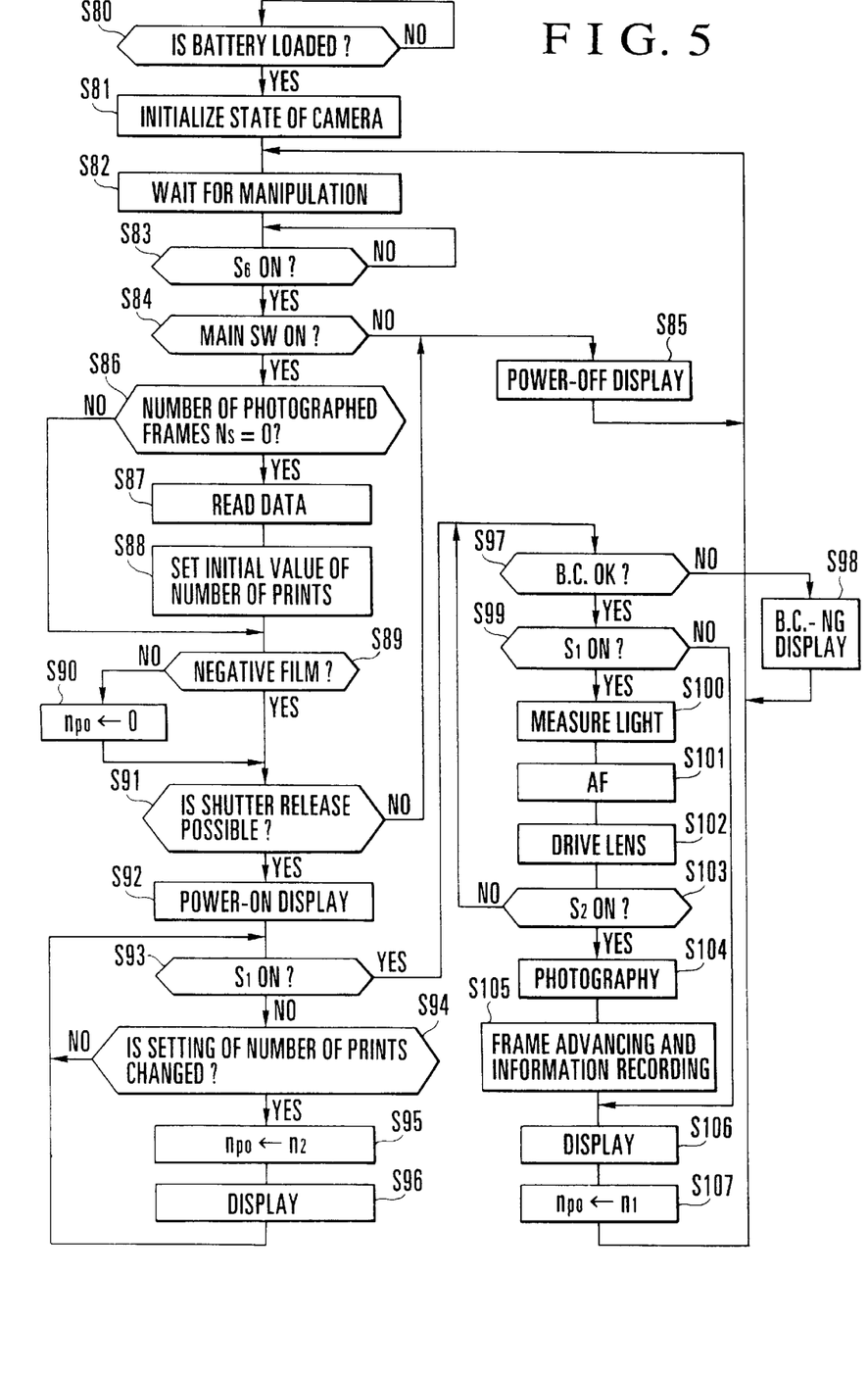
FIG. 5 is a flowchart of the operation of the control microcomputer of FIG. 2, showing a second embodiment of the present invention.

A second embodiment of the present invention will be described below with reference to FIG. 5 which shows another flowchart of the operation of the control microcomputer 21 shown in FIG. 2. This flowchart shows a main routine, in which the respective operations of Steps S80 to S87 are identical to those of Steps S30 to S37 shown in FIG. 3. If the process proceeds from Step S87 to Step S88, the initial value $n_{PO}$ of the number of prints, which is set by the number-of-prints setting switch $S_5$, is set to $n_{PO=n1}$ (Step S88). Thus, the number of prints for each frame of one film cartridge is determined as a common initial value of the number of prints. (In Step S94, the setting of the number of prints may also be changed for each frame.) Then, it is determined through the data reading circuit 29 whether the loaded film 2 is a negative film (Step S89). If the film 2 is not a negative film, the initial value $n_{PO}$ of the number of prints is set to "0". Then, in Steps S91 to S106, operations which are identical to those of Steps S41 to S56 shown in FIG. 3 are performed. Incidentally, if the initial value $n_{PO}=n_1$ of the number of prints is changed to a different value $n_{PO}=n_2$ in Steps S94 and S95, the different value $n_{PO}=n_2$ is reset to the initial value $n_{PO}=n_1$ in Step S107. Thus, if a user desires to obtain five prints from the tenth frame and two prints from each of the other frames, he/she may set $n_1=2$ as the initial value $n_p$ of the number of prints, and $n_2=5$ at the time of exposure of the tenth frame. By this setting, the number of prints is set to "5" only at the time of exposure of the tenth frame, and is automatically reset to "2" at the time of exposure of the eleventh frame. Accordingly, it is possible to meet such a demand while ensuring high manipulability and preventing erroneous manipulation.

The reading of data by the data reading circuit 29 in Step S37 of FIG. 3 and Step S87 of FIG. 5 will be described below.

Figure 7:
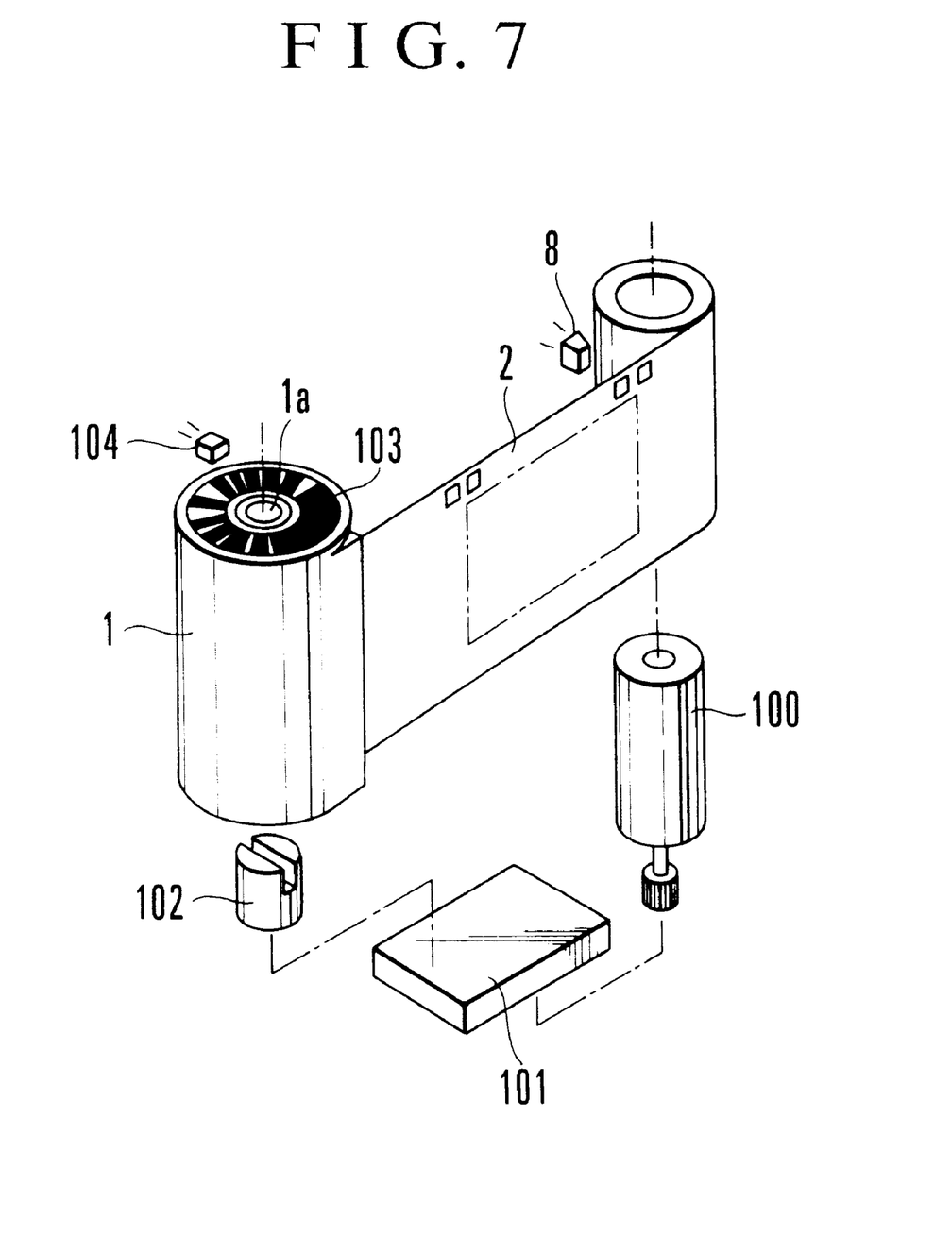
FIG. 7 is a schematic perspective view of the internal arrangement of a camera, showing the second embodiment of the present invention.

FIG. 7 is a perspective view showing the internal arrangement of the camera. A motor 100, which is driven by the transport circuit 26, rotates a fork 102 via a gear unit 101, and a spool 1a provided inside the film cartridge 1 is rotated by the fork 102 brought into engagement with the spool 1a, so that feeding and rewinding of the film 2 from and into the film cartridge 1 is performed. A data disk 103 is arranged to rotate integrally with the spool 1a provided inside the film cartridge 1, and various data relative to the film cartridge 1, such as data representing whether the film 2 is negative or positive, are recorded on the data disk 103 in the form of a bar code. An LED 104 constitutes part of a photoreflector of the data reading circuit 29 for detecting the bar code of the data disk 103.

The data reading operation of each of Step S37 of FIG. 3 and Step S87 of FIG. 5 will be described below with reference to FIG. 7 in accordance with the flowchart (shown in FIG. 6) of the operation of the control microcomputer 21 of FIG. 2.

Figure 6:
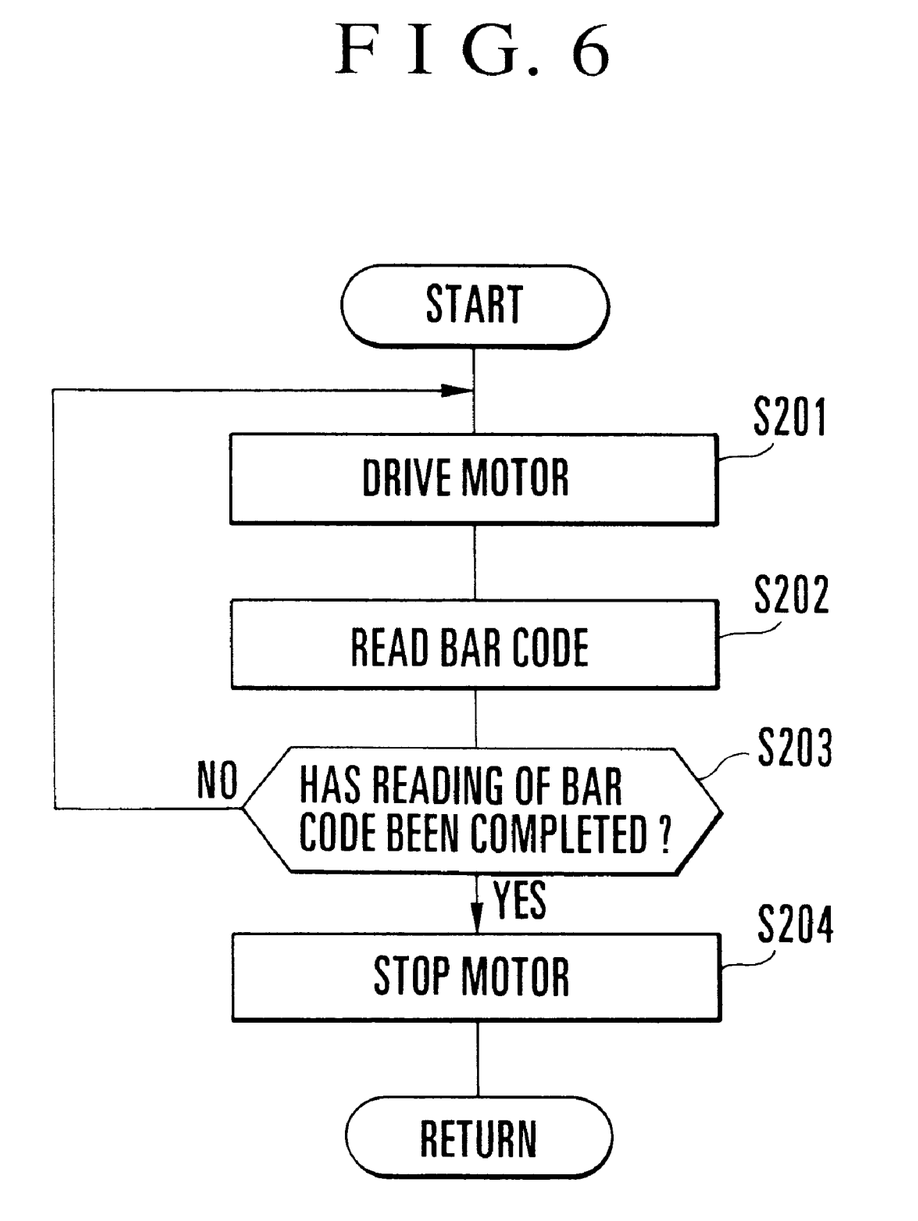
FIG. 6 is a flowchart of the operation of the control microcomputer of FIG. 2, showing the second embodiment of the present invention.

First, in Step S201, the motor 100 is rotated by the transport circuit 26, and this rotation causes the spool 1a provided inside the film cartridge 1 and engaged with the fork 102 to rotate in a film rewinding direction via the gear unit 101 and the fork 102.

Thus, the data disk 103 integral with the spool 1a provided inside the film cartridge 1 rotates together with the spool 1a. In the next step S102, the LED 104 of the bar code detecting photoreflector of the data reading circuit 29 is turned on and the data reading circuit 29 sequentially reads the bar code information written on the data disk 103. In Step S203, it is checked whether the reading of the bar code information from the data disk 103 has been completed. If the reading of the bar code information has not yet been completed, the process returns to Step S201. If the reading of the bar code information is completed, the motor 100 is stopped by the transport circuit 26 (step S204).

Although in each of the above-described embodiments whether the loaded film is a negative film or a positive film is determined from the bar code provided on the film cartridge, the present invention is not limited to this method and can be applied to any other method capable of determining whether the loaded film is a negative film or a positive film, by utilizing another part of the film cartridge, the magnetic recording part of the film or the like.

Although each of the above-described embodiments is arranged to indicate the number of prints to a photofinishing laboratory by writing the number of prints to the magnetic recording part of the film, it is possible to adopt any other method capable of recording the number of prints to be indicated to a photofinishing laboratory. For example, the number of prints to be indicated to a photofinishing laboratory may be recorded on a film by a method different from magnetic recording, or the number of prints may be indicated with a bar code provided on a film cartridge.

As a matter of course, in the present invention, the number of prints to be indicated to a photofinishing laboratory may be set to an arbitrary number.

Although in the present invention the number of prints is indicated by determining whether the loaded film is a negative film or a positive film, the present invention can also be applied to an arrangement for indicating the number of prints by using a kind-of-film determining method other than the above-described one.

The present invention can also be applied to various image recording media other than a film.

The present invention can also be applied to a film cartridge of the type which differs from the film cartridge used in the above-described embodiments, or a cartridge having an image recording medium other than a film.

The software arrangement and the hardware arrangement of each of the above-described embodiments may be replaced, as required.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The present invention can also be carried out by combining the above-described embodiments or technical elements thereof with each other, as required.

The present invention can be applied to other kinds of arrangements. For example, the whole or part of the arrangement set forth herein or in the appended claims may constitute one apparatus, or may be connected to other apparatus, or may constitute an element which forms part of another apparatus.

The present invention can also be applied to various types of cameras such as a single-lens reflex camera, a lens shutter camera or a video camera, optical apparatuses other than such cameras, apparatuses other than the optical apparatuses, apparatuses applied to the cameras or the optical or other apparatuses, or elements which constitute part of such apparatuses.

What is claimed is:

1. An apparatus, comprising:
    (A) determination means for determining whether a film loaded in the apparatus is a negative film or a positive film; and
    (B) indication means for indicating a certain number of prints in accordance with a determination result by said determination means, said indication means being capable of changing said certain number to a different number.

2. An apparatus according to claim 1, wherein said determination means includes reading means for reading, from a film cartridge of the film loaded in the camera, information representing whether the film is a negative film or a positive film.

3. An apparatus according to claim 1, wherein said determination means includes reading means for reading, from a bar code provided on a film cartridge of the film loaded in the camera, information representing whether the film is a negative film or a positive film.

4. An apparatus according to claim 1, wherein said determination means includes reading means for reading, from the film loaded in the camera, information representing whether the film is a negative film or a positive film.

5. An apparatus according to claim 1, wherein said determination means includes reading means for reading, from a magnetic recording part of the film loaded in the camera, information representing whether the film is a negative film or a positive film.

6. An apparatus according to claim 1, wherein said indication means includes recording means for recording the number of prints on the film loaded in the camera.

7. An apparatus according to claim 1, wherein said indication means includes recording means for recording the number of prints on a film cartridge of the film loaded in the camera.

8. An apparatus according to claim 1, wherein said indication means includes recording means for recording the number of prints on a bar code provided on a film cartridge of the film loaded in the camera.

9. An apparatus according to claim 1, wherein said indication means includes means for indicating a number of prints as one if a determination result by said determining means is a negative film.

10. An apparatus according to claim 1, wherein said indication means includes means for indicating a number of prints as zero if a determination result by said determining means is a positive film.

11. An apparatus according to claim 1, wherein said indication means includes means for indicating the number of prints as a same number for an entire film in accordance with the determination result by said determination means.

12. An apparatus according to claim 1, wherein said indication means includes changing means for permitting changing of the number of prints to be indicated, with respect to a required frame.

13. An apparatus in accordance with claim 1 wherein: said indication means automatically returns to a state of indicating said certain number after each photography even if said certain number is changed to said different number.

14. A camera comprising:
(A) determination means for determining whether a film loaded in the camera is a negative film or a positive film; and
(B) indication means for indicating a certain number of prints in accordance with a determination result by said determination means, said indication means being capable of changing said certain number to a different number.

15. A camera according to claim 14, wherein said determination means includes reading means for reading, from a film cartridge of the film loaded in the camera, information representing whether the film is a negative film or a positive film.

16. A camera according to claim 14, wherein said determination means includes reading means for reading, from a bar code provided on a film cartridge of the film loaded in the camera, information representing whether the film is a negative film or a positive film.

17. A camera according to claim 14, wherein said determination means includes reading means for reading, from the film loaded in the camera, information representing whether the film is a negative film or a positive film.

18. A camera according to claim 14, wherein said determination means includes reading means for reading, from a magnetic recording part of the film loaded in the camera, information representing whether the film is a negative film or a positive film.

19. A camera according to claim 14, wherein said indication means includes recording means for recording the number of prints on the film loaded in the camera.

20. A camera according to claim 14, wherein said indication means includes recording means for recording the number of prints on a film cartridge of the film loaded in the camera.

21. A camera according to claim 14, wherein said indication means includes recording means for recording the number of prints on a bar code provided on a film cartridge of the film loaded in the camera .

22. A camera according to claim 14, wherein said indication means includes means for indicating a number of prints as one if a determination result by said determining means is a negative film.

23. A camera according to claim 14, wherein said indication means includes means for indicating a number of prints as zero if a determination result by said determining means is a positive film.

24. A camera according to claim 14, wherein said indicating means includes means for indicating the number of prints as a same number for an entire film in accordance with the determination result by said determination means.

25. A camera according to claim 14, wherein said indication means includes changing means for permitting changing of the number of prints to be indicated, with respect to a required frame.

26. A camera in accordance with claim 14 wherein: said indication means automatically returns to a state of indicating said certain number after each photography even if said certain number is changed to said different number.

27. An apparatus comprising:
(A) a determination device which determines whether a film loaded in the apparatus is a negative film or a positive film; and
(B) an indication device which indicates a certain number of prints in accordance with a determination result by said determination device, said indication device being capable of changing said certain number to a different number.

28. An apparatus according to claim 27, wherein said determination device includes a reading device for reading, from a film cartridge of the film loaded in the camera, information representing whether the film is a negative film or a positive film.

29. An apparatus according to claim 27, wherein said determination device includes a reading device for reading, from a bar code provided on a film cartridge of the film loaded in the camera, information representing whether the film is a negative film or a positive film.

30. An apparatus according to claim 27, wherein said determination device includes a reading device for reading, from the film loaded in the camera, information representing whether the film is a negative film or a positive film.

31. An apparatus according to claim 27, wherein said determination device includes a reading device for reading, from a magnetic recording part of the film loaded in the camera, information representing whether the film is a negative film or a positive film.

32. An apparatus according to claim 27, wherein said indication device includes a recording device for recording the number of prints on the film loaded in the camera.

33. An apparatus according to claim 27, wherein said indication device includes a recording device for recording the number of prints on a film cartridge of the film loaded in the camera.

34. An apparatus according to claim 27, wherein said indication device includes a recording device for recording the number of prints on a bar code provided on a film cartridge of the film loaded in the camera.

35. An apparatus according to claim 27, wherein said indication device includes a device for indicating a number of prints as one if a determination result by said determining device is a negative film.

36. An apparatus according to claim 27, wherein said indication device includes a device for indicating a number of prints as zero if a determination result by said determining device is a positive film.

37. An apparatus according to claim 27, wherein said indication device includes a device for indicating the number of prints as a same number for an entire film in accordance with the determination result by said determination device.

38. An apparatus according to claim 27, wherein said indication device includes a changing device for permitting changing of the number of prints to be indicated.

39. An apparatus according to claim 27, wherein said indication device includes a changing device for permitting changing of the number of prints to be indicated, with respect to a required frame.

40. An apparatus in accordance with claim 27 wherein:

said indication device automatically returns to a state of indicating said certain number after each photography even if said certain number is changed to said different number.

41. A camera comprising:

(A) a determination device which determines whether a film loaded in the camera is a negative film or a positive film; and (B) an indication device which indicates a certain number of prints in accordance with a determination result by said determination device, said indication device being capable of changing said certain number to a different number.

42. A camera according to claim 41, wherein said determination device includes a reading device for reading, from a film cartridge of the film loaded in the camera, information representing whether the film is a negative film or a positive film.

43. A camera according to claim 41, wherein said determination device includes a reading device for reading, from a bar code provided on a film cartridge of the film loaded in the camera, information representing whether the film is a negative film or a positive film.

44. A camera according to claim 41, wherein said determination device includes a reading device for reading, from the film loaded in the camera, information representing whether the film is a negative film or a positive film.

45. A camera according to claim 41, wherein said determination device includes a reading device for reading, from a magnetic recording part of the film loaded in the camera, information representing whether the film is a negative film or a positive film.

46. A camera according to claim 41, wherein said indication device includes a recording device for recording the number of prints on the film loaded in the camera.

47. A camera according to claim 41, wherein said indication device includes a recording device for recording the number of prints on a film cartridge of the film loaded in the camera.

48. A camera according to claim 41, wherein said indication device includes a recording device for recording the number of prints on a bar code provided on a film cartridge of the film loaded in the camera.

49. A camera according to claim 41, wherein said indication device includes a device for indicating a number of prints as one if a determination result by said determining device is a negative film.

50. A camera according to claim 41, wherein said indication device includes a device for indicating a number of prints as zero if a determination result by said determining device is a positive film.

51. A camera according to claim 41, wherein said indicating device includes a device for indicating the number of prints as a same number for an entire film in accordance with the determination result by said determination device.

52. A camera according to claim 41, wherein said indication device includes a changing device for permitting changing of the number of prints to be indicated.

53. A camera according to claim 41, wherein said indication device includes a changing device for permitting changing of the number of prints to be indicated, with respect to a required frame.

54. A camera in accordance with claim 41 wherein:

said indication device automatically returns to a state of indicating said certain number after each photography even if said certain number is changed to said different number.

* * * * *